(12) United States Patent
Terada

(10) Patent No.: US 7,631,629 B2
(45) Date of Patent: Dec. 15, 2009

(54) HEAT TRANSFER MEMBER FOR BALANCER HOUSING

(75) Inventor: Tatsuhiro Terada, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 12/174,843

(22) Filed: Jul. 17, 2008

(65) Prior Publication Data
US 2009/0050100 A1    Feb. 26, 2009

(30) Foreign Application Priority Data
Jul. 17, 2007    (JP)    .............. 2007-185713

(51) Int. Cl.
F02B 75/06    (2006.01)
(52) U.S. Cl. ..................... 123/192.2; 74/603
(58) Field of Classification Search .............. 123/192.2; 74/603, 604
See application file for complete search history.

(56) References Cited

FOREIGN PATENT DOCUMENTS

| JP | 01-134757 U | 5/1989 |
|---|---|---|
| JP | 03-059432 U | 6/1991 |
| JP | 05-296019 A | 1/1993 |
| JP | 2000227015 A | 8/2000 |
| JP | 2001-289055 A | 10/2001 |
| JP | 2003-201912 A | 7/2003 |
| JP | 2003-262253 A | 9/2003 |
| JP | 2004225603 A | 8/2004 |
| JP | 2005-009637 A | 1/2005 |
| JP | 2006-105402 A | 4/2006 |

*Primary Examiner*—Noah Kamen
(74) *Attorney, Agent, or Firm*—Sughrue Mion, PLLC

(57) ABSTRACT

A multi-cylinder internal combustion engine in which pistons provided in a plurality of cylinders are coupled to a crankshaft by connecting rods, an oil pan for storing oil is mounted below a crankcase, and a balancer device which has a balancer shaft driven to rotate in accordance with rotation of the crankshaft and a balancer housing for accommodating the balancer shaft is housed between the crankcase and the oil pan, the multi-cylinder internal combustion engine having a heat transfer member that is provided between the balancer housing and the oil pan and below the balancer shaft, and comes into contact with the balancer housing and the crankcase.

11 Claims, 13 Drawing Sheets

CRANK SHAFT ANGLE

HEAT TRANSFER MEMBER FOR BALANCER HOUSING

INCORPORATION BY REFERENCE

The disclosure of Japanese Patent Application No. 2007-185713 filed on Jul. 17, 2007 including the specification, drawings and abstract is incorporated herein by reference in its entirety.

BACKGROUND OF THE INVENTION

1. Field of the Invention

This invention relates to a multi-cylinder internal combustion engine, and more particularly to a multi-cylinder internal combustion engine for using a balancer device to prevent secondary vibration caused by reciprocation of a piston.

2. Description of the Related Art

Among the internal combustion engines for vehicles, such as a series four-cylinder engine with a relatively large exhaust capacity, there is known an internal combustion engine mounted with a balancer device for canceling secondary inertia force which worsens vibration/noise problems.

Secondary inertia force is a type of inertia force that is changed by the number of vibrations that is twice the number of engine revolutions. In principle of operation of the piston crank mechanism of an engine, the maximum speed of pistons is at a point near the top dead center (TDC) of crank movement even when the rotation speed of the crank is constant, as shown in FIG. 8, and movement of the reciprocating masses of the pistons or the like connected to a crankshaft is not obtained as complete simple harmonic vibration (sinusoidal vibration). Consequently, out of four cylinders, the inertia forces of No. 1 and No. 4 cylinders and the inertia forces of No. 2 and No. 3 cylinders having different phases deform as shown in the upper graph of FIG. 9B (dotted line and two-dot chain line), and combinations of such inertia forces create a secondary component.

A balancer device of a related art has a balancer shaft that is integrally mounted with a balancer shaft mass capable of generating inertia force of equal magnitude as, but different phase from, the secondary inertia force (see, for example, Japanese Patent Application Publication No. 2005-9637 (JP-A-2005-9637), Japanese Patent Application Publication No. 2001-289055 (JP-A-2001-289055), Japanese Patent Application Publication No. 05-296019 (JP-A-05-296019), Japanese Patent Application Publication No. 2003-201912 (JP-A-2003-201912), Japanese Patent Application Publication No. 2006-105402 (JP-A-2006-105402), and Japanese Patent Application Publication No. 2003-262253 (JP-A-2003-262253)), wherein the balancer device rotates two balancer shafts in mutually opposing directions in the same phase to offset unnecessary vibration components caused by the rotations of the balancer shafts, as shown in FIG. 10 (see, for example, JP-A-2001-289055, JP-A-2003-201912, JP-A-2006-105402, and JP-A-2003-262253).

Because the balancer shafts of the balancer device rotate at a rotation speed twice as high as that of a crankshaft, bearings of a balancer housing that support the balancer shafts need to be lubricated and cooled sufficiently. Therefore, as with journal parts of the crankshaft, the bearings of the balancer shafts are supplied with oil from a main oil gallery of the engine (see JP-A-2005-9637, for example).

There is also known a balancer device in which a baffle plate for regulating excessive variation of the oil level of an oil pan is provided in the vicinity of the balancer device in order to be able to securely suction the oil within the oil pan into an oil pump even when the vehicle accelerates/decelerates or corners, the baffle plate being formed integrally with a balancer housing (see JP-A-2005-9637, for example).

However, since the multi-cylinder internal combustion engine described above has a constitution in which the baffle plate is located above the rotational centers of the balancer shafts (the crankshaft side) or on the side of the balancer shafts, the oil flows down from the balancer device directly into the oil pan. Therefore, the bearings of the balancer shafts rotating at a rotation speed twice as high as that of the crankshaft are cooled entirely by the circulating and supplied oil, and heat from the balancer housing cannot be dissipated sufficiently. For this reason, a sufficient durability of the balancer device cannot be obtained.

SUMMARY OF THE INVENTION

This invention provides a multi-cylinder internal combustion engine that improves the durability of a balancer device by promoting dissipation of heat generated from a balancer housing.

A first aspect of this invention relates to a multi-cylinder internal combustion engine in which pistons provided in a plurality of cylinders are coupled to a crankshaft by connecting rods, an oil pan for storing oil is mounted below a crankcase in which the crankshaft is accommodated, and a balancer device which has a balancer shaft driven to rotate in accordance with rotation of the crankshaft and a balancer housing for accommodating the balancer shaft is housed between the crankcase and the oil pan. This multi-cylinder internal combustion engine has a heat transfer member that is provided between the balancer housing and the oil pan and below the balancer shaft, and comes into contact with the balancer housing and the crankcase.

In the above constitution, because the heat transfer member is in contact with the balancer housing and the crankcase below both the crankshaft and the balancer shaft, the heat transfer member can promote dissipation of heat generated from the balancer housing. Moreover, dissipation of heat generated from the balancer housing can be encouraged more by cooling the heat transfer member by means of oil flowing down from both the crankshaft and the balancer housing to the oil pan. As the balancer shaft rotates, the oil within the balancer device is scraped out laterally by a mass part of the balancer shaft or flows down from an oil hole formed on a bottom surface of the balancer housing. The amount of this oil represents a certain flow rate, and a great oil cooling effect is obtained.

In the multi-cylinder internal combustion engine having the above constitution, the heat transfer member may cover a lower part of a shaft center part of the balancer shaft and be in contact with the balancer housing, which rotatably supports the balancer shaft, in the vicinity of a bearing of the balancer housing.

In this case, the heat transfer member is securely cooled by the oil flowing down from the balancer shaft to the oil pan side, and thus dissipation of heat generated from the balancer housing is encouraged more. Note that the shaft center part of the balancer shaft may indicate an intermediate part of the balancer shaft in the axial direction or, for example, a part other than bearing journals provided on both ends of the balancer shaft.

In the multi-cylinder internal combustion engine having the above constitution, the heat transfer member may be configured with a baffle plate that faces an oil level of the oil pan.

According to this constitution, a sufficient heat transfer area for releasing heat from the balancer housing can be secured easily by using the existing baffle plate.

In the multi-cylinder internal combustion engine having the above constitution, the heat transfer member may be composed of a sheet metal that has a thermal conductivity equal to or higher than that of the balancer housing and the crankcase.

According to this constitution, the heat transfer member that is suitable for functioning to transmit heat and regulate variation of the oil level can be realized easily by press working, which leads to a decrease in manufacturing cost.

In the multi-cylinder internal combustion engine having the above constitution, the heat transfer member may have an opening part for causing the oil to flow down from the balancer device side into the oil pan.

In this case, the oil cooling effect can be further improved by, for example, causing the oil to flow down onto an oil strainer provided in the oil pan.

In the multi-cylinder internal combustion engine having the above constitution, the heat transfer member may have a first tightening part that is tightened to the crankcase by a bolt and a second tightening part that is tightened to the balancer housing by a bolt.

According to this configuration, dissipation of heat generated from the balancer housing can be expectantly realized securely by the heat transfer member.

According to this invention, because the heat from the balancer housing can be dissipated by the heat transfer member, and the heat transfer member can be cooled by the oil that flows down from both the crankshaft and the balancer housing to the oil pan, the oil that is scraped out from the balancer device by the rotation of the balancer shaft or the oil that flows down from the bottom surface side of the balancer housing can be effectively utilized to cool the heat transfer member, so that dissipation of the heat from the balancer housing can be promoted, and consequently the durability of the balancer device can be improved.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

Embodiments of the invention are described hereinafter with reference to the drawings.

FIGS. 1 to 4 are each a drawing that shows a multi-cylinder internal combustion engine according to an embodiment of the invention and illustrates the case where the invention is applied to a so-called four-cycle four-cylinder gasoline engine of horizontally laid type.

First of all, the constitution of the embodiment is described with reference to FIGS. 1 to 7.

Figure 1:
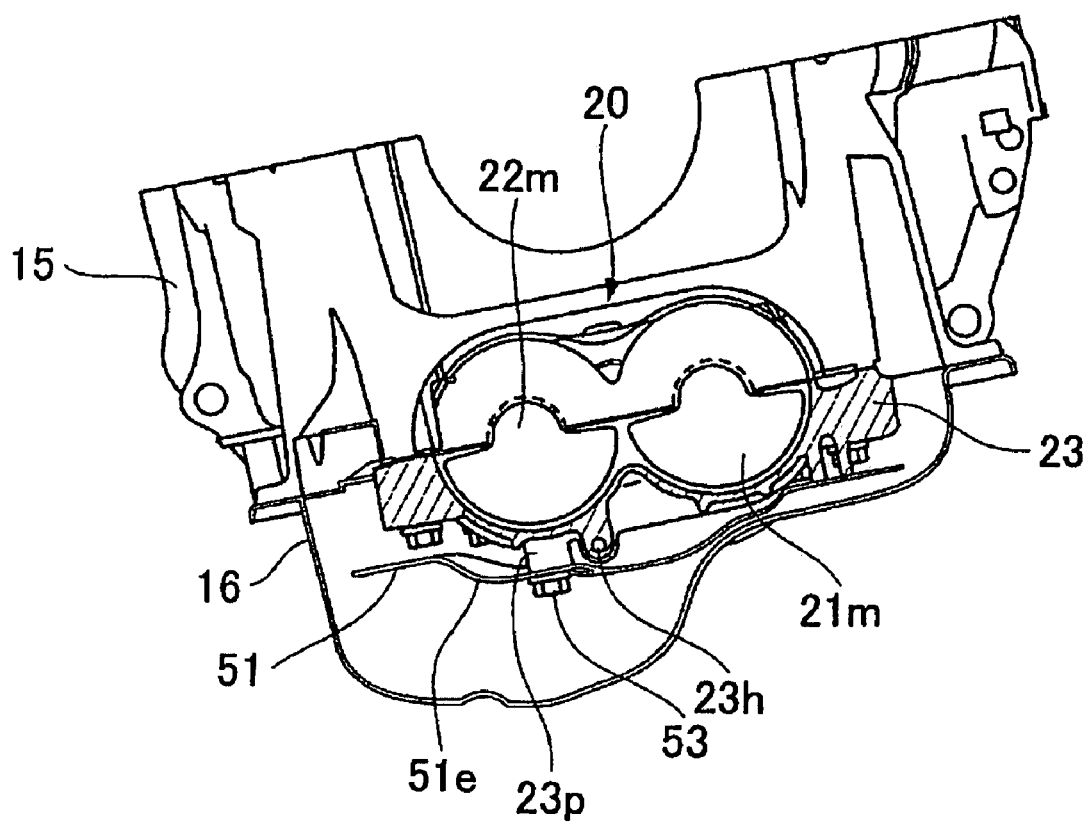
FIG. 1 is a front cross-sectional view showing the periphery of a balancer device that is positioned in a lower part of a multi-cylinder internal combustion engine according to one embodiment of the invention.
Figure 2:
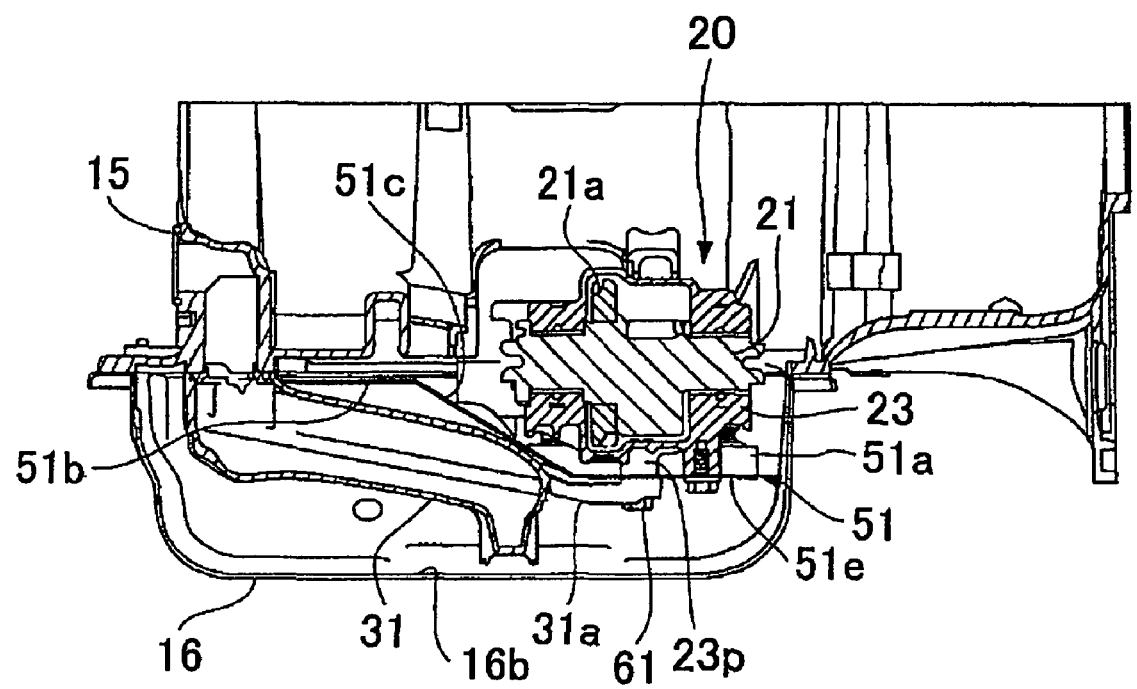
FIG. 2 is a side cross-sectional view showing the periphery of the balancer device that is positioned in the lower part of the multi-cylinder internal combustion engine according to the embodiment of the invention.
Figure 3:
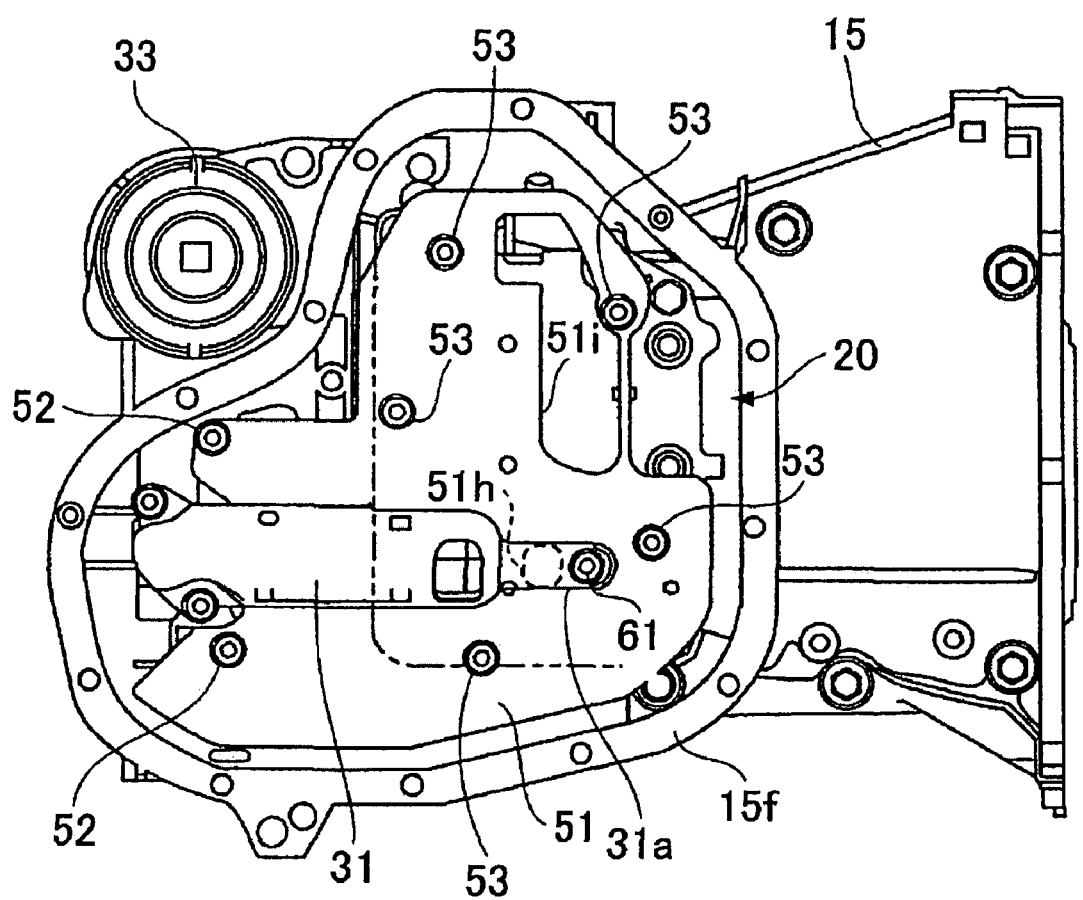
FIG. 3 is a bottom view of a crankcase, which shows a state in which a baffle plate is mounted on the lower side of the balancer device according to the embodiment of the invention.
Figure 4:
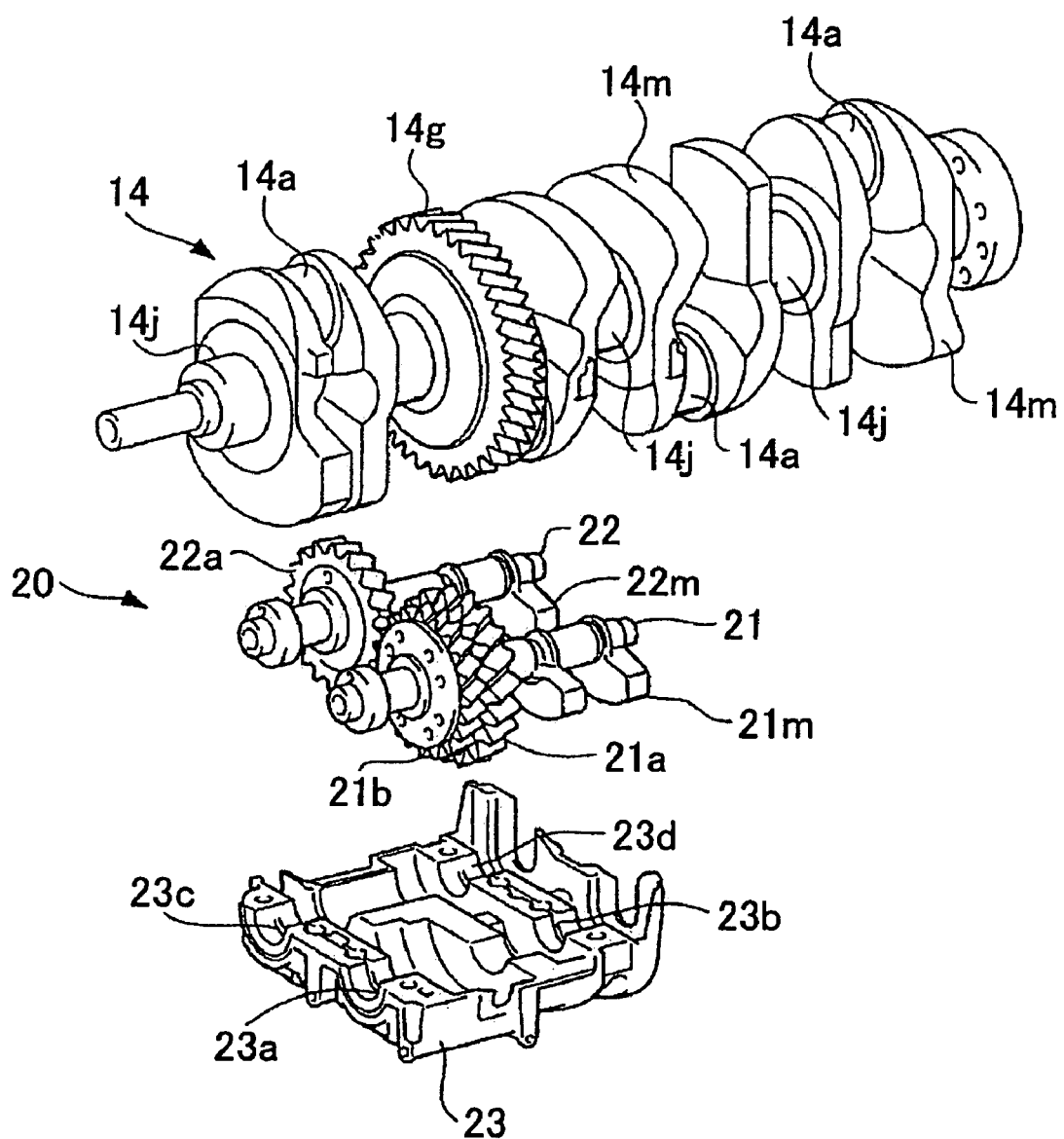
FIG. 4 is an exploded perspective view of the balancer device according to the embodiment of the invention.
Figure 5A:
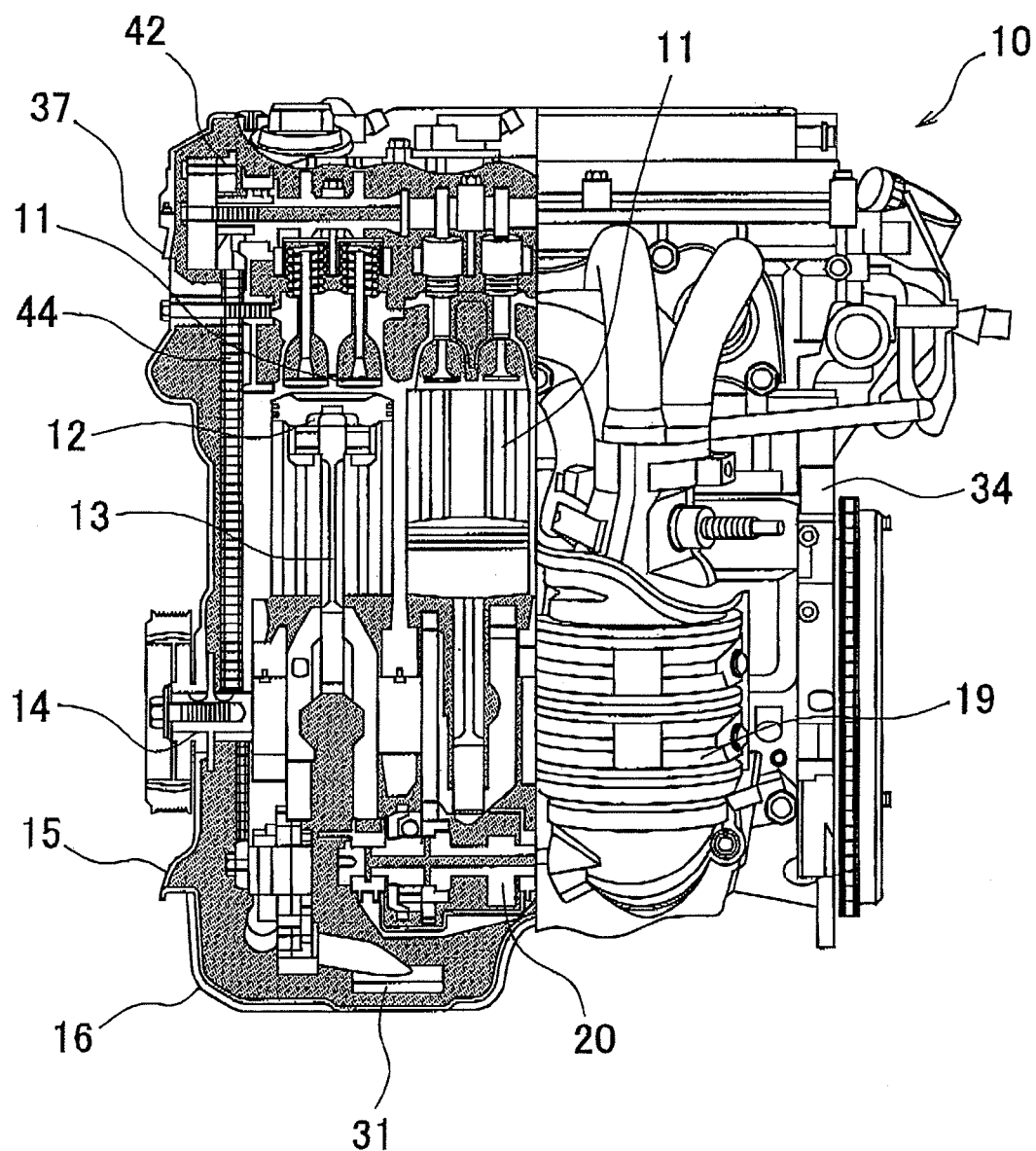
FIG. 5A is a side view showing a partial cross section of the multi-cylinder internal combustion engine according to the embodiment of the invention.
Figure 5B:
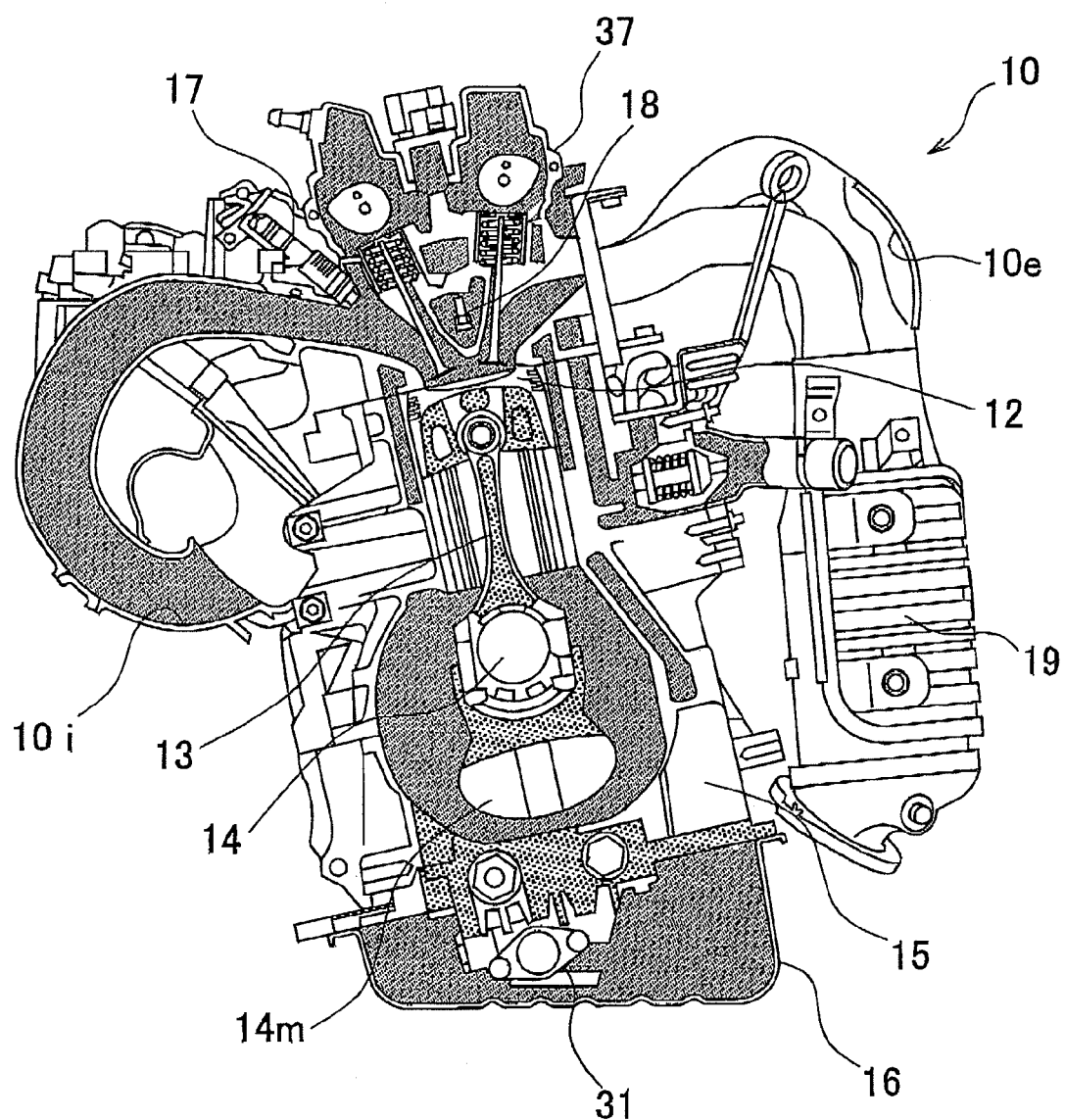
FIG. 5B is a front cross-sectional view of the above engine.
Figure 6A:
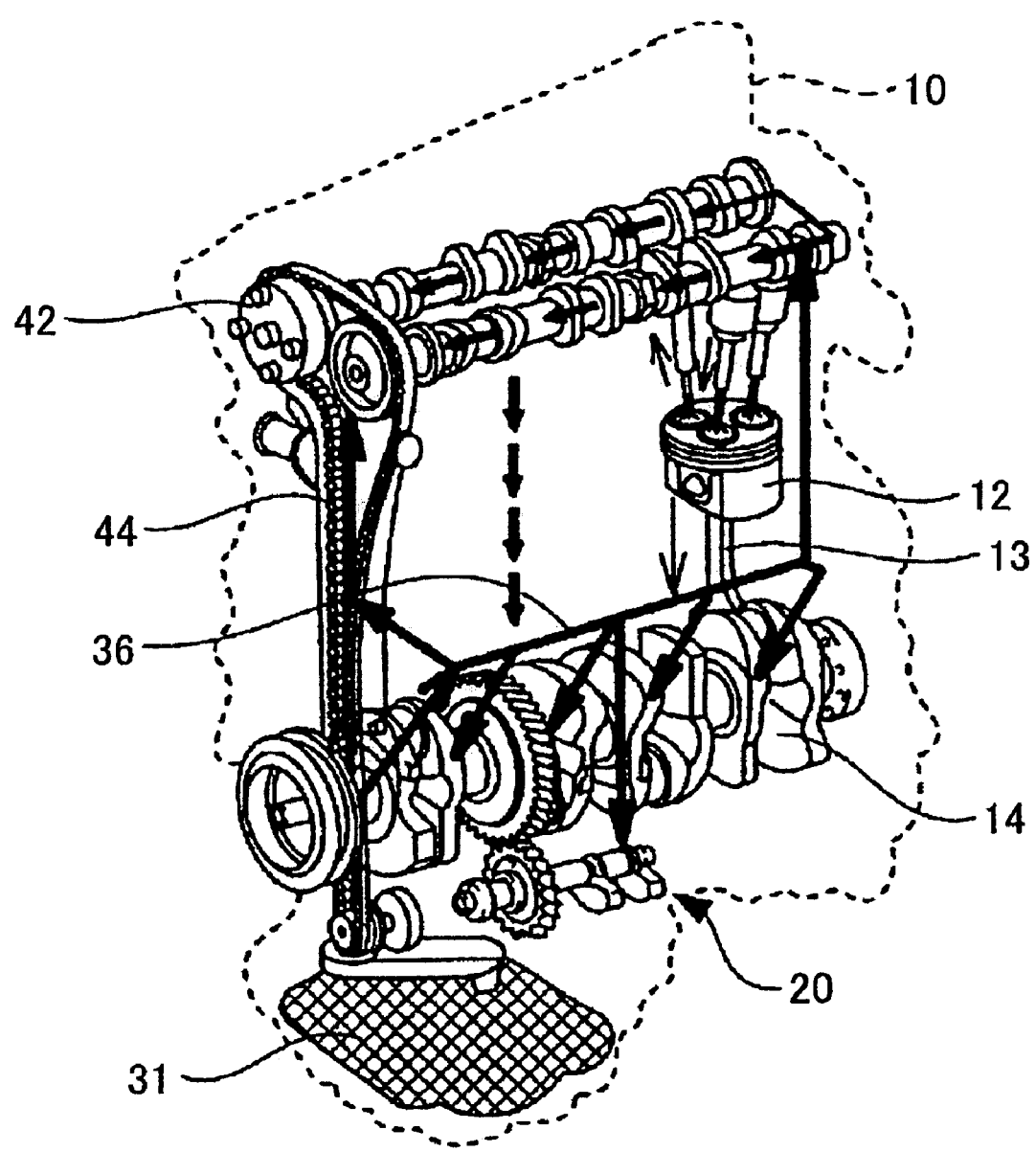
FIG. 6A is a perspective view schematically showing a disposition pattern of an oil gallery of the multi-cylinder internal combustion engine according to the embodiment of the invention.
Figure 6B:
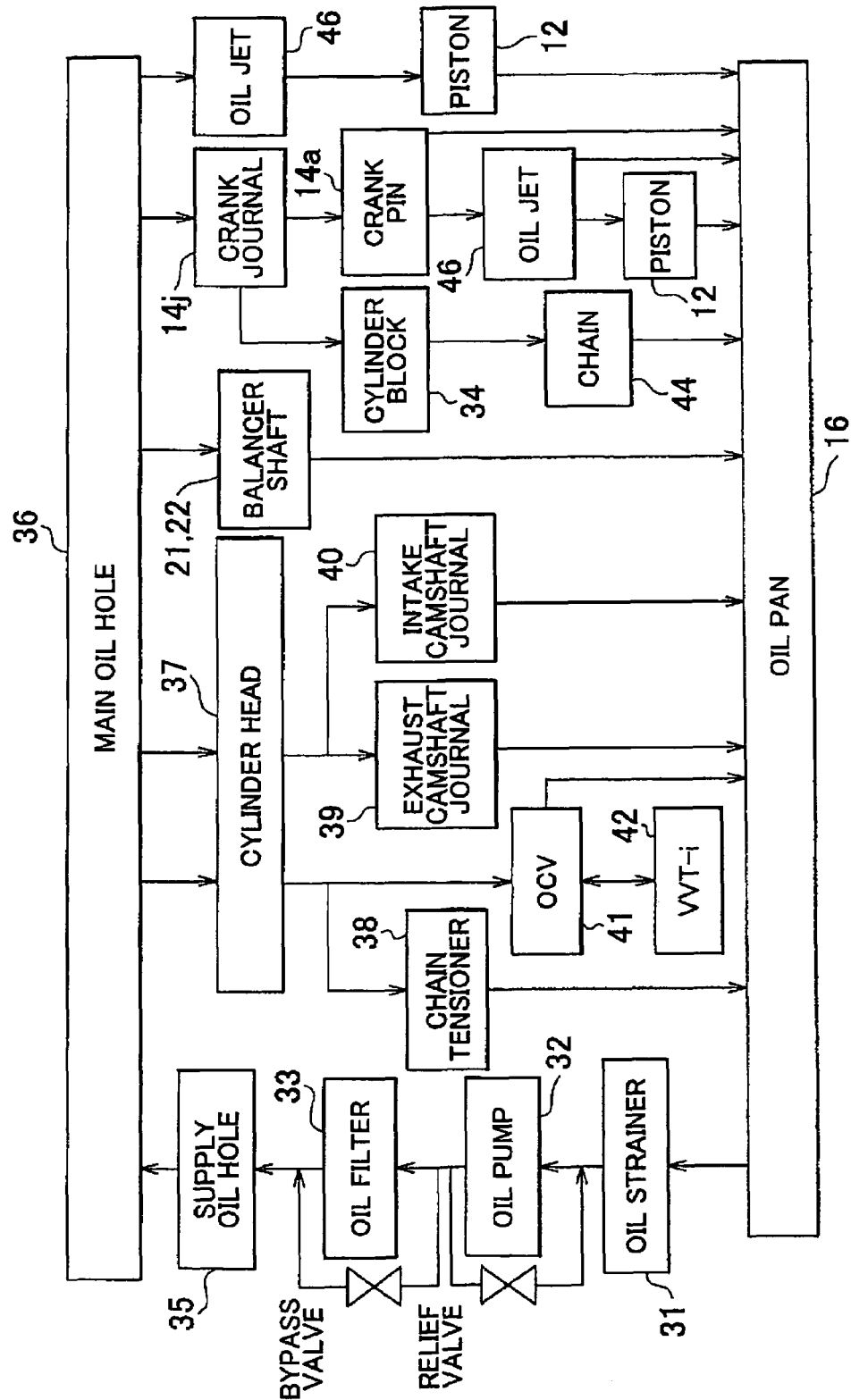
FIG. 6B is a block diagram for explaining a circulation path in which lube oil of the engine circulates.
Figure 7A:
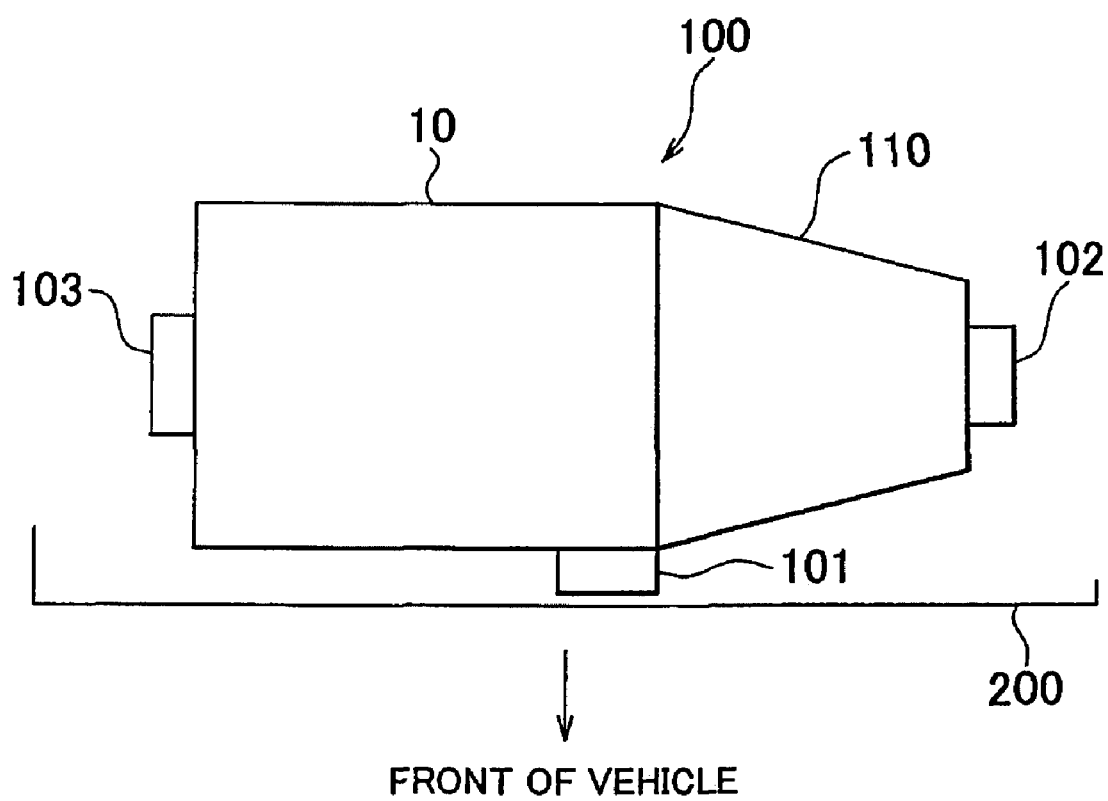
FIG. 7A is a schematic diagram showing a disposition of an engine mount that supports the multi-cylinder internal combustion engine of the embodiment of the invention on a vehicle body side.
Figure 7B:
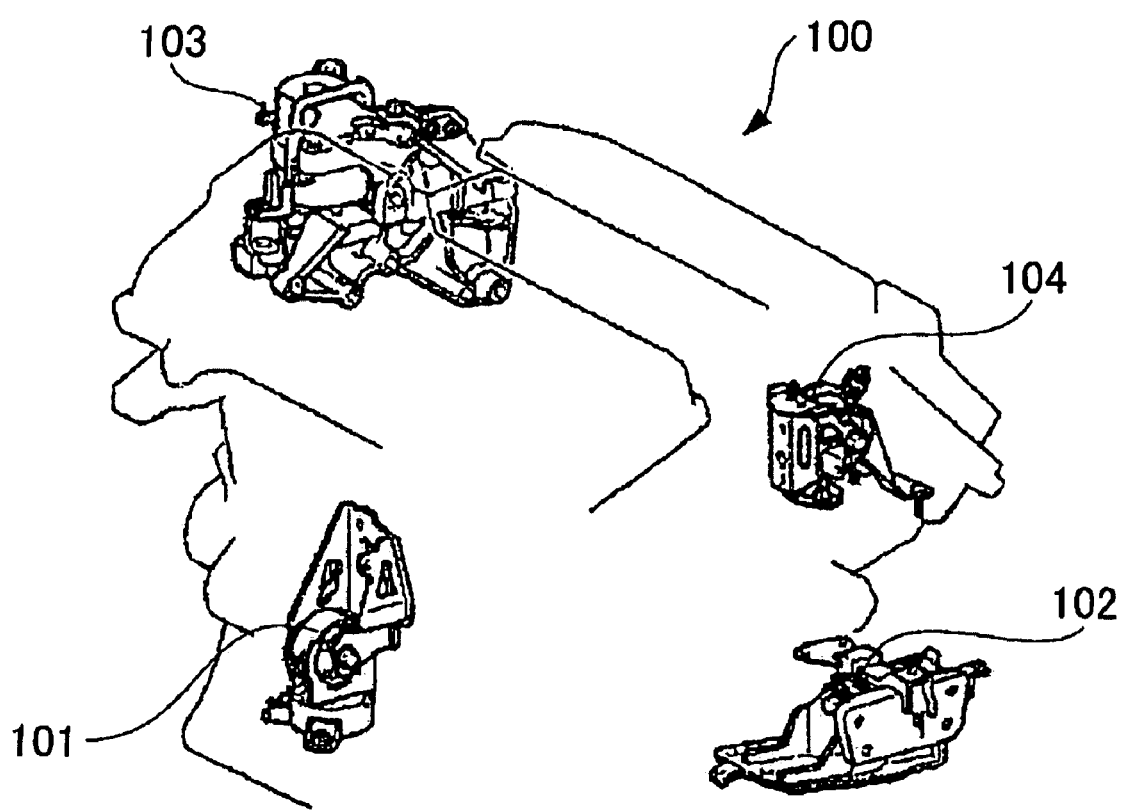
FIG. 7B is a perspective view of the engine mount.
Figure 8:
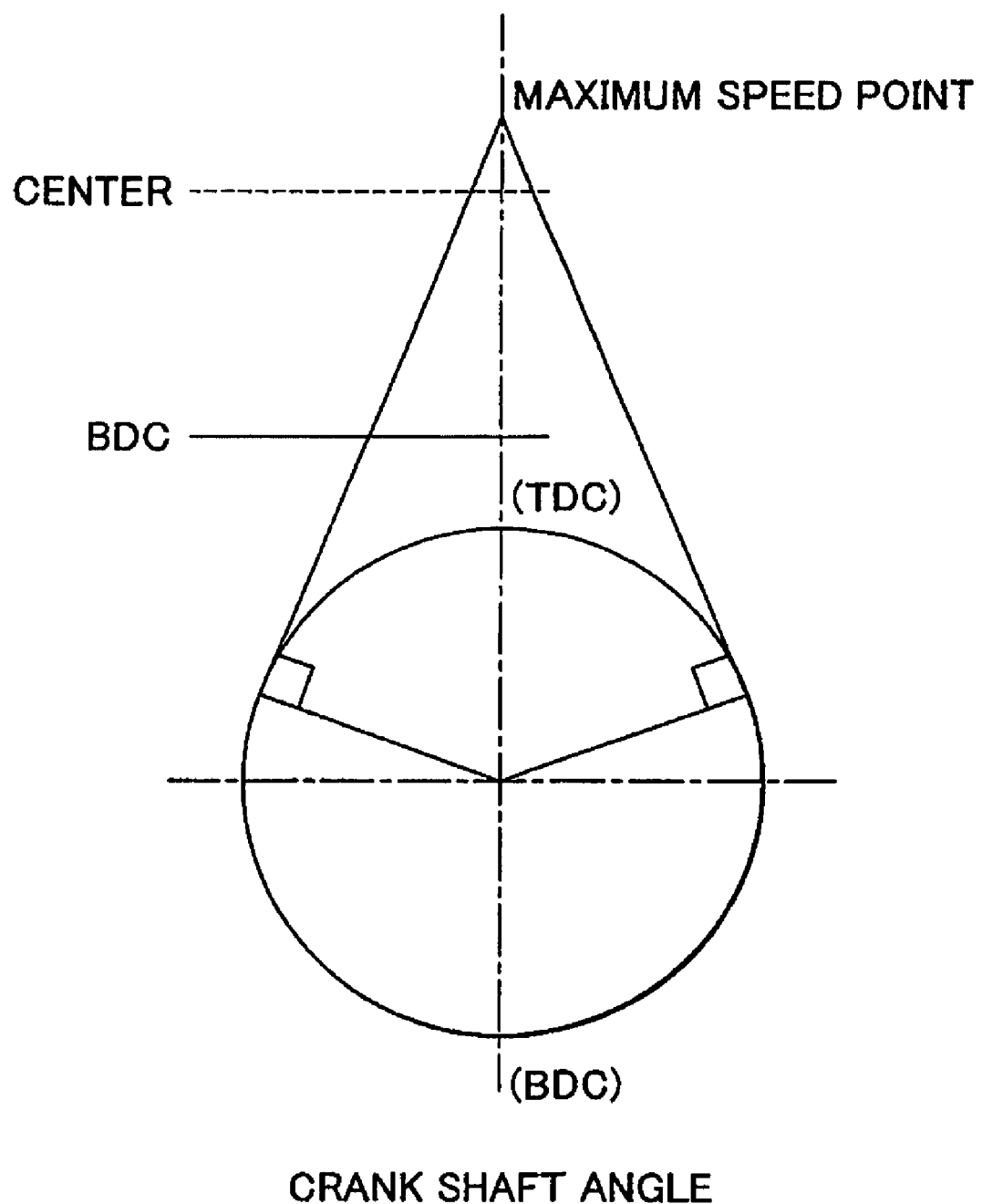
FIG. 8 is an explanatory diagram showing the principle of a crank mechanism of a four-cylinder internal combustion engine of a related art.
Figure 9A:
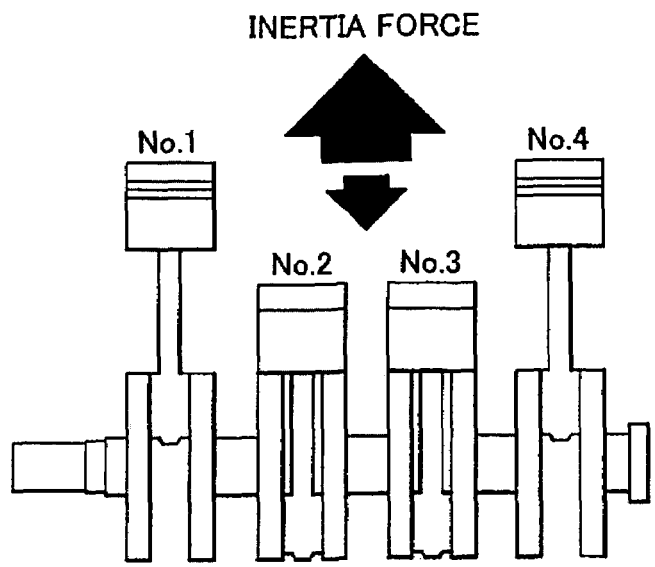
FIGS. 9A and 9B are each an explanatory diagram for explaining the cause of secondary inertia force generated in the four-cylinder internal combustion engine of the related art.
Figure 9B:
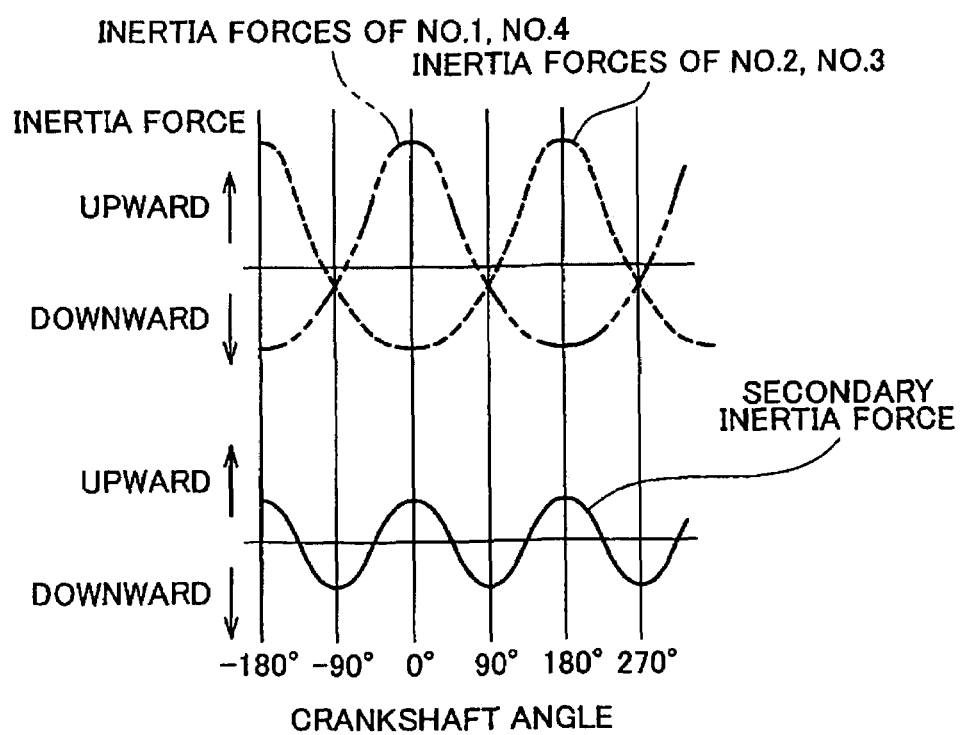
Figure 10:
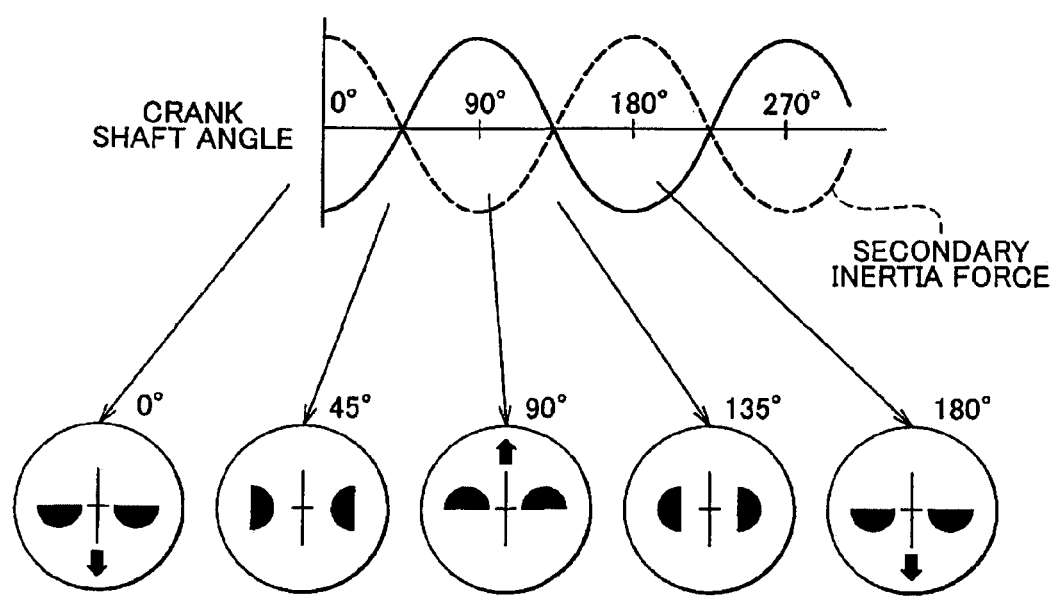
FIG. 10 is an explanatory diagram showing the operations of a balancer device according to the related art.

FIG. 1 is a front cross-sectional view showing the periphery of a balancer device that is positioned in a lower part of the engine of the embodiment. FIG. 2 is a side cross-sectional view showing the periphery of the balancer device. FIG. 3 is a bottom view of a crankcase, which shows a state in which a baffle plate is mounted on the lower side of the balancer device. FIG. 4 is an exploded perspective view of the balancer device. FIG. 5A is a side view showing a partial cross section of the engine. FIG. 5B is a front cross-sectional view of the engine. FIG. 6A is a perspective view schematically showing a disposition pattern of an oil gallery of the engine. FIG. 6B is a block diagram for explaining a circulation path in which lube oil of the engine circulates. FIG. 7A is a schematic diagram showing a disposition of an engine mount that supports the engine of the embodiment on a vehicle body side. FIG. 7B is a perspective view of the engine mount.

In a multi-cylinder internal combustion engine 10 of the embodiment, pistons 12 provided within four (plural) cylinders 11 are coupled to crank pins 14a of a crankshaft 14 by connecting rods 13 and an oil pan 16 for storing oil (engine oil) is mounted on the lower side of a crankcase 15 in which the crankshaft 14 is accommodated, as shown in FIGS. 4, 5A and 5B. This engine 10 is elastically supported to a vehicle body 200 (the detail of which is not shown) via a plurality of conventional engine mounts 101, 102, 103 and 104 in a position inclined forward at a predetermined angle, the engine mounts configuring a power unit 100 integrated with a transmission 110, as shown in FIGS. 7A and 7B.

As shown in FIGS. 4, 5A and 5B, the crankshaft 14 has counterweights 14m corresponding to the four crank pins 14a respectively and crank journals 14j that are positioned axially on both sides of each of the counterweights 14m and between the cylinders. The crankshaft 14 is supported rotatably to the crankcase 15 side by each of the crank journals 14j.

On the other hand, a balancer device 20 is provided between the crankcase 15 and the oil pan 16, as shown in FIGS. 1 to 4.

This balancer device 20 has balancer shafts 21, 22 that are driven to rotate in response to rotation of the crankshaft 14, and a balancer housing 23 that accommodates these balancer shafts 21, 22.

The balancer shaft 21 is mounted integrally with a balancer shaft driven gear 21a that is meshed with a balancer shaft drive gear 14g mounted in the crankshaft 14, and a gear 21b for reversely rotating the balancer shafts 21, 22 in synchronism. The balancer shaft 22, on the other hand, is mounted integrally with a gear 22a that is meshed with the synchronization gear 21b of the balancer shaft 21.

These balancer shafts 21, 22 are integrally mounted with balancer shaft masses 21m, 22m (see FIG. 4) in order to generate inertia force of equal magnitude as, but different phase from, secondary inertia force that worsens vibration/noise problems (see [0004]), as in the abovementioned related arts, and serve to cancel the secondary inertia force that is generated due to a combination of movements of the reciprocating masses of the pistons 12 of the four cylinders and the connecting rods 13, the movements being deformed from sinusoidal vibrations. Moreover, the two balancer shafts 21, 22 are rotated in mutually opposing directions in the same phase to offset unnecessary vibration components caused by the rotations of the balancer shafts 21, 22.

As shown in FIGS. 5A, 5B and 6B, the engine 10 is provided with a conventional oil pump 32 for pumping up oil contained in the oil pan 16 by means of an oil strainer 31. The oil is supplied from this oil pump 32 to an oil filter 33 and a supply oil hole 35 and main oil hole 36 that are formed within a cylinder block 34 of the engine 10. The oil is then supplied from the main oil hole 36 to a chain tensioner 38, exhaust camshaft journal 39 and intake camshaft journal 40 that are provided within a cylinder head 37, an oil control valve 41 for controlling a variable valve timing mechanism 42, the crank journals 14j of the crankshaft 14, and a chain 44 provided within the cylinder block 34. The oil is further supplied from the crank pins 14a and an oil jet 46 to the pistons 12.

The oil is also supplied from the main oil hole 36 directly to the balancer shafts 21, 22 of the balancer device 20, and the balancer housing 23 has formed therein a plurality of oil passages 23h (the detail on the shape of the oil passages are not shown) for supplying the oil to four bearings 23a, 23b, 23c, 23d that support the journal parts of the right and left balancer shafts 21, 22, as shown in FIGS. 1 and 4.

Because the balancer shafts 21, 22 of the balancer device 20 rotate at a rotation speed twice as high as that of the crankshaft 14, the four bearings of the balancer housing 23 that support the balancer shafts 21, 22 need to be lubricated and cooled sufficiently. Therefore, as with the journal parts of the crankshaft 14, the bearings 23a, 23b, 23c, 23d are supplied with the oil directly from the main oil 36 serving as a main oil gallery of the engine 10.

As shown in FIGS. 1 to 3, a baffle plate 51 for regulating excessive variation of the oil level of the oil pan 16 is provided in the vicinity of the balancer device 20 in order to be able to securely suction the oil of the oil pan into the oil pump even when the vehicle accelerates/decelerates or corners.

This baffle plate 51 is positioned between the balancer housing 23 and the oil pan 16 and below the balancer shafts 21, 22 (a part away from the crankshaft 14). The baffle plate 51 also serves as a heat transfer member that comes into contact with the balancer housing 23 and the crankcase 15 to transfer heat of the balancer housing 23 and the crankcase 15. Furthermore, the baffle plate 51 covers at least the lower parts of shaft center parts of the balancer shafts 21, 22 and faces the oil level of the oil pan 16. This baffle plate 51 is in contact with the balancer housing 23 in the vicinity of the bearings 23a to 23d of the balancer housing 23 that rotatably supports the balancer shafts 21, 22. Here, the shaft center parts of the balancer shafts 21, 22 mean intermediate parts of the balancer shafts in the axial direction, other than bearing journals positioned on both ends of each of the balancer shafts 21, 22.

As shown in FIGS. 1 to 3, the baffle plate 51 is made of a plate-like metal material, i.e., a sheet metal, which has a thermal conductivity equal to or higher than that of the balancer housing 23 and the crankcase 15, and is molded by press working to have the contour shape, bent shape and convexo-concave shape as shown in the drawings.

More specifically, the baffle plate 51 extends substantially parallel to a bottom wall part 16b of the oil pan 16 below the balancer device 20 so as to cover the lower parts of the parts other than the journal parts on both ends of each of the balancer shafts 21, 22, as shown in FIG. 2. Moreover, the baffle plate 51 has a first plate part 51a that has a concave shape to be the deepest beneath the central part of the balancer device 20 in the horizontal direction, as shown in FIG. 1. The baffle plate 51 further has a second plate part 51b, which is tightened to the crankcase 15 by a bolt at a position higher than the position of the first plate 51a, and a third plate part 51c, which extends obliquely downward from the second plate part 51b to the first plate part 51a, the second plate part 51b and the third plate part 51c being positioned above the oil strainer 31 on the left side of FIG. 2.

The horizontal width of the baffle plate 51 (horizontal direction in FIG. 1) is greater than the horizontal width of the balancer housing 23 of the balancer device 20. Specifically, the lateral width of the baffle plate 51 within a plane perpendicular to the axial directions of the balancer shafts is greater than the lateral width of the balancer housing. Therefore, the oil, which is scraped out of the balancer housing 23 by the balancer shaft masses 21m, 22m, the balancer shaft driven gear 21a and the gears 21b, 22a as the balancer shafts 21, 22 rotate, is caused to drop on the baffle plate 51.

In addition, as shown in FIG. 3, the contour shape of the baffle plate 51 resembles the shape of an open rim part 15f in which the oil pan 16 is mounted at the bottom surface side of the crankcase 15, wherein a convexo-concave part 51e (see FIG. 1), opening parts 51h, 51i, and the like are formed according to need, in order to form a passage for cooling the other members with oil or to avoid mechanical interference with adjacent parts.

The oil can be caused to flow down from the balancer device 20 into the oil pan 16 through the opening parts 51h, 51i. For example, the opening part 51h of the baffle plate 51 causes the oil that drops onto a predetermined area of the baffle plate 51 to flow down onto the oil strainer 31 or, for example, a leading end 31a of the oil strainer 31 (suctioning side end). The leading end 31a of the oil strainer 31 is tightened to the baffle plate 51 and the balancer housing 23 by a bolt 61, and the oil that drops out of the opening part 51h of the baffle plate 51 is brought into contact with the leading end 31a of the oil strainer 31 in the vicinity of the tightening section. In this case, the oil strainer 31, along with the baffle plate 51, also functions as the heat transfer member for heat dissipation to transfer heat from the balancer housing 23 side to the crankcase 15 side.

The baffle plate 51 further has a plurality of first tightening parts 52 that are in the shape of bolt holes (the shape of the holes are not shown, but the holes are basically in a circular or oval shape) and tightened to the crankcase 15 by bolts, and a plurality of second tightening parts 53 that are in the shape of bolt holes and tightened to the balancer housing 23 by bolts. The first tightening parts 52 are provided on the second plate part 51b of the baffle plate 51, while the second tightening parts 53 are provided on the first plate part 51a and the third plate part 51c. The balancer housing 23 also is provided with at least one or, for example, a plurality of projecting tightening parts 23p having a tightening surface and external screw holes for bolt tightening that correspond to the second tightening parts 53.

As shown in FIGS. 5 and 6, a valve mechanism is provided in an upper part of the engine 10, wherein an injector 17 (fuel injection valve) for injecting fuel into, for example, an intake passage 10i and a spark plug 18 are disposed in an upper part of each cylinder 11. The plurality of injectors 17 corresponding to the plurality of cylinders 11 are connected, respectively, to a delivery pipe (not shown) that supplies the fuel to the plurality of cylinders 11. The fuel (e.g., gasoline) ejected from a fuel pump of a fuel tank is supplied to this delivery pipe via a predetermined fuel passage. A catalytic device 19 is disposed on an exhaust passage 10e. Note that the engine 10 may be a gasoline direct injection engine, a port-injection engine, a dual injection engine that executes both port injection and direct injection, a diesel engine, or an engine that uses fuel different from fuel gas (such as liquid petroleum gas (LPG) and liquid natural gas (LNG)). The injectors 17 and spark plug 18 are disposed in the vicinity of the corresponding cylinders, and activation of the injectors 17 and the spark plug 18 is controlled, respectively, by fuel injection signals and an ignition timing control signal that are sent from an engine electric control unit (ECU) (not shown) that electronically controls the engine 10.

The operations are described next.

In the engine 10 of the embodiment having the above constitution, the baffle plate 51 is positioned below the crankshaft 14 and both the balancer shafts 21, 22, and is in contact with the balancer housing 23 and crankcase 15 so as to be able to transfer heat. Therefore, when the temperature of the balancer housing 23 supporting the balancer shafts 21, 22 increases as a result of high-speed rotation of the balancer shafts 21, 22 during operation of the engine 10, dissipation of heat from the balancer housing 23 is promoted by heat transfer (heat conduction) performed by the baffle plate 51 and oil strainer 31.

Moreover, because the baffle plate 51 is cooled by the oil that flows down from both the crankshaft 14 and balancer housing 23 to the oil pan 16 side, dissipation of heat from the balancer housing 23 is further encouraged. Especially because the oil within the balancer device 20 is scraped out laterally by the mass parts 21m, 22m as the balancer shafts 21, 22 rotate, and then flows down also from the oil hole (not shown) formed on the bottom surface of the balancer housing 23, the flow rate of this oil is relatively large, and thus a sufficient oil cooling effect can be expected.

In this embodiment, since the baffle plate 51 and the oil strainer 31 can be securely cooled by the oil flowing down from the balancer shafts 21, 22 to the oil pan 16, dissipation of the beat from the balancer housing 23 is encouraged.

Also, a sufficient heat transfer area for releasing the heat from the balancer housing 23 can be secured easily by using the existing baffle plate 51.

Furthermore, the baffle plate 51 that is suitable for functioning to transfer heat (heat transmission) and regulate variation of the oil level can be realized easily by press working to obtain a sheet metal, which leads to a decrease in the cost of manufacturing the baffle plate.

Moreover, the oil cooling effect can be further improved by, for example, causing the oil to flow down onto the oil strainer 31 provided in the oil pan 16.

Therefore, according to the multi-cylinder internal combustion engine of the embodiment, because the heat from the balancer housing 23 can be dissipated by the baffle plate 51, and the baffle plate 51 can be cooled by the oil that flows down from both the crankshaft 14 and the balancer housing 23 to the oil pan 16 side, the oil that is scraped out from the balancer device 20 by the rotation of the balancer shafts 21, 22 or flows down from the bottom surface side of the balancer housing 23 can be effectively utilized to cool the baffle plate 51, so that dissipation of the heat from the balancer housing 23 can be promoted. As a result, the multi-cylinder internal combustion engine capable of improving the durability of the balancer device 20 can be provided.

As described above, this invention can provide a multi-cylinder internal combustion engine, which is capable of cooling a heat transfer member by effectively utilizing oil that flows down from the balancer device as a balancer shaft rotates, and promoting dissipation of heat from a balancer housing to improve the durability of the balancer device. This multi-cylinder internal combustion engine is useful in general multi-cylinder internal combustion engines, particularly in a multi-cylinder internal combustion engine that uses a balancer device to prevent secondary vibration caused by reciprocation of pistons.

What is claimed is:

1. A multi-cylinder internal combustion engine in which pistons provided in a plurality of cylinders are coupled to a crankshaft by connecting rods, an oil pan for storing oil is mounted below a crankcase in which the crankshaft is accommodated, and a balancer device which has a balancer shaft driven to rotate in accordance with rotation of the crankshaft and a balancer housing for accommodating the balancer shaft is housed between the crankcase and the oil pan, the multi-cylinder internal combustion engine comprising:
a heat transfer member that is positioned between the balancer housing and the oil pan and below the balancer shaft, and comes into contact with the balancer housing and the crankcase.

2. The multi-cylinder internal combustion engine according to claim 1, wherein the heat transfer member covers a lower part of a shaft center part of the balancer shaft.

3. The multi-cylinder internal combustion engine according to claim 1, wherein the heat transfer member is in contact with the balancer housing, which rotatably supports the balancer shaft, in the vicinity of a bearing of the balancer housing.

4. The multi-cylinder internal combustion engine according to claim 1, wherein the heat transfer member has a baffle plate that faces an oil level of the oil pan.

5. The multi-cylinder internal combustion engine according to claim 4, wherein the heat transfer member further has an oil strainer which, along with the baffle plate, comes into contact with the balancer housing.

6. The multi-cylinder internal combustion engine according to claim 5, wherein the baffle plate has an opening part for causing the oil to flow down from the balancer device side onto the oil strainer.

7. The multi-cylinder internal combustion engine according to claim 1, wherein the heat transfer member comprises a sheet metal that has a thermal conductivity equal to or higher than that of the balancer housing and the crankcase.

8. The multi-cylinder internal combustion engine according to claim 1, wherein the heat transfer member has an opening part for causing the oil to flow down from the balancer device side into the oil pan.

9. The multi-cylinder internal combustion engine according to claim 1, wherein the heat transfer member has a first tightening part that is tightened to the crankcase by a bolt and a second tightening part that is tightened to the balancer housing by a bolt.

10. The multi-cylinder internal combustion engine according to claim 9, wherein the balancer housing has a tightening surface corresponding to the second tightening part, and wherein the tightening surface of the balancer housing is positioned in the vicinity of the bearing of the balancer housing that rotatably supports the balancer shaft.

11. The multi-cylinder internal combustion engine according to claim 1, wherein a width of the heat transfer member within a plane perpendicular to an axial direction of the balancer shaft is greater than a width of the balancer housing.

* * * * *

UNITED STATES PATENT AND TRADEMARK OFFICE
CERTIFICATE OF CORRECTION

| | |
|---|---|
| PATENT NO. | : 7,631,629 B2 |
| APPLICATION NO. | : 12/174843 |
| DATED | : December 15, 2009 |
| INVENTOR(S) | : Terada |

It is certified that error appears in the above-identified patent and that said Letters Patent is hereby corrected as shown below:

Title Page, Item (54) and Column 1, lines 1 & 2, Title:

Delete the present title and replace with the following:

MULTI-CYLINDER INTERNAL COMBUSTION ENGINE

Signed and Sealed this
Sixteenth Day of August, 2011

David J. Kappos
*Director of the United States Patent and Trademark Office*